United States Patent [19]
Davis

[11] Patent Number: 5,272,748
[45] Date of Patent: Dec. 21, 1993

[54] ENHANCED SPEED CALLING

[75] Inventor: George Davis, Glenn Dale, Md.

[73] Assignee: Bell Atlantic Network Services, Inc., Arlington, Va.

[21] Appl. No.: 703,642

[22] Filed: May 21, 1991

[51] Int. Cl.⁵ .................. H04M 3/44; H04M 7/00; H04M 17/00

[52] U.S. Cl. ........................ 379/63; 379/88; 379/144; 379/154; 379/201; 379/216; 379/222

[58] Field of Search ............ 379/216, 58, 63, 207, 379/67, 88, 112, 144, 355, 196, 154, 222

[56] References Cited

U.S. PATENT DOCUMENTS

| | | | |
|---|---|---|---|
| 4,769,834 | 9/1988 | Billinger et al. | 379/112 |
| 4,827,500 | 5/1989 | Binkerd et al. | 379/88 |
| 4,899,373 | 2/1990 | Lee et al. | 379/207 |
| 4,926,471 | 5/1990 | Ikeda | 379/216 |
| 4,953,203 | 8/1990 | Shepard | 379/207 |

Primary Examiner—Thomas W. Brown
Attorney, Agent, or Firm—Lowe, Price, LeBlanc & Becker

[57] ABSTRACT

Enhanced speed calling is provided on a network basis for public access telephone stations such as coin telephones and wireless public Telepoint services stations. The system permits single digit access to voice recorded announcements regarding long distance dialing instruction and service provider identification information. The dialing of a common generic abbreviated code word triggers the delivery of a pre-established interexchange carrier recording identifying the presubscribed carrier to the user at the calling public access telephone station. The information card presently utilized at public access telephone stations, such as coin stations, is replaced with a generic card providing information to lead the caller to use the abbreviated code word to initiate identification of the presubscribed interexchange carrier for that public access telephone station. The speed calling feature also permits the use of generic abbreviated code words to obtain connection with public service providers convenient to the public access telephone station from which a call is made. The enhanced speed dialing is adapted to all stored program control switches without the addition of extra equipment and concomitant capital investment.

24 Claims, 6 Drawing Sheets

PRESENT DIAL INSTRUCTION CARD

A Bell Atlantic Company

C&P Telephone

Repair: 954-5060

Local: 20¢
(Local calls outside area code must dial area code)
Directory Assistance (charges may apply)
Local (D.C. & Suburbs): 411
Toll: 1 + or 1 + Area Code+555-1212
Long Distance - Direct Dial
 All calls: 1 + Area Code + Number
Calling Call or Operator Assisted
 All calls: 0 + Area Code + Number

36

Calls carried by: C & P TELEPHONE, a Bell Atlantic Co. where authorized.
P.O. Box 41434, Washington, DC 20018
Dial Operator   34

Other calls carried by: CALL TECHNOLOGY CORPORATION
100 Smith Drive. Paradise, PA 19113
1-800-XXX-NNNN You have the right to use your preferred carrier from this phone. Contact them for an access number. Rates are available from your carrier upon request. For operator services complaints write to: FCC Enforcement Division, C.C.B. Room 6202 Washington, DC 20554.

EMERGENCY: DIAL 911       For Refunds: Dial Operator.

ENHANCED SPEED CALLING

TECHNICAL FIELD

This invention relates generally to public telecommunications networks and more particularly to a means and methodology for providing expanded utility to public access telephones.

BACKGROUND ART

Public access to the public switched telephone network has been most conventionally provided through public coin telephone stations. In order to satisfy current regulatory requirements applicable to such stations each instrument must provide notification as to the identity of the local Service Provider as well as the Long Distance Provider. This information is presently posted on the instrument on a Dial Instruction Card which includes instructions for use of the telephone along with the name of the Service Provider, such as a regional telephone company, and the name of the Long Distance Provider of Interexchange Carrier (IXC), such as AT&T, MCI, Sprint, etc.

When the Service Provider or long distance carrier is changed it is necessary to change the Notification Cards. In a typical regional telephone company the long distance carrier may be changed sufficiently frequently to require in excess of 5,000 card changes per month per region at a typical expense of approximately $2.5 million a year. In addition to these changes the cognizant regulatory agencies may also require a change or addition or additional information which necessitates a change of all cards. This may cost such a regional telephone company as much as $6 million for a complete exchange of cards. All such costs to a greater or lesser degree ultimately are reflected in the rate structure and result in increased consumer charges.

In addition to the foregoing problem the older practice of providing at each public coin telephone station a directory or set of directories has become a present impossibility as a practical matter. Such directories disappear in short order or are progressively mutilated by the tearing out of pages to obtain telephone numbers. This results in considerable public inconvenience in ability to contact public services such as taxis, tow trucks and the like.

DISCLOSURE OF THE INVENTION

It is an object of the present invention to provide enhanced speed calling on a network basis as a feature applicable to coin telephones and wireless public "Telepoint" service which allows single number access to voice recorded announcements regarding dial instruction and service provider information. Since Telepoint base stations are not normally viewed by the user, Dial Instruction Cards are ineffective and the required information must be provided audibly. It is an object of the invention to convey that information in a convenient and expedient manner.

It is another object of the invention to provide convenient quick access to public services such as taxi, towing and the like.

According to the invention software changes may be made in existing generic central office switch programs to provide the addition of Speed Calling to coin telephones while blocking the option of dialed in changes to speed calling lists. This generic over-write permits the use of common or universal speed calling lists capable of providing nationwide commonality. Such common lists save program space and allow one or virtually all public telephones in a central switching office to access the same list.

An example of Enhanced Speed Calling according to the invention is to so program a central office switch so that dialing the character or code word "2#" from any public telephone station, wired or wireless, accesses the same information and is translated as, for example, 700-555-1212. This number automatically establishes a route to the Long Distance Provider (Interexchange Carrier) no matter when or how often service order changes of such carriers occur. Once the IC is accessed a recorded announcement is received from the IC stating name, address and (800) number, information which is presently carried by the card attached to each coin telephone. The recorded information received by the calling party is provided by the IC and its content may be readily modified if additional information is required by reason of regulatory or other changes. Virtually instant compliance becomes possible.

Universal Number Identification constitutes an additional feature of the invention which will allow users to dial a single digit to reach often accessed services. Such services may be provided on a city-wide, sector-wide, or larger area basis simply by creating common Speed Calling lists and posting this information on a new generic dial instruction card or in user's manuals for wireless Telepoint telephones.

It is an object of the invention to provide improved one number dialing, Universal Number Identification, remote information updating, and satisfaction of dial instruction card requirements for Service Provider and Long Distance Provider information.

The invention provides the advantages of virtually no hardware changes, a reduction in the cost of replacing signs (which may average 5,000 monthly), savings on sign changes due to PIC changes (which may be $2.5 million per year per region), savings on overall sign changes to satisfy additional information requirements (as much as $6 million per change), and satisfaction of all FCC and other regulatory requirements.

The methodology of the invention is easy to use, constitutes an aid to the handicapped, requires no directory with common service access, provides universal number identification anywhere and audible information for wireless stations, and saves time by eliminating number look-ups. The invention has the effect of increasing use of the public telecommunications network, limiting interruptions to users needing information, and requires no access to public telephones or wireless base station locations for service personnel to change information.

While it may be possible to manufacture coin telephones to include integrated recordings on RAM storage, such a system would be relatively expensive to administer and require purchase and installation of new coin telephones. The invention permits the use of existing coin telephones with the provision of generic dial instruction cards. The long distance provider virtually automatically provides the necessary IC recordings without increased expense to either the IC or the regional Telco. At the same time the system may virtually eliminate long distance provider end user complaints which result from users relying on outdated IC provider information supplied by the conventional cards.

The system of the invention is completely compatible with freedom of choice of long distance carrier, use of personal speed dialers and provides a uniquely expedient means for satisfying information requirements to wireless telephones.

A particular object and advantage of the invention is to provide improved service to the handicapped, particularly to those having sight impairment.

Still other objects and advantages of the present invention will become readily apparent to those skilled in the art from the following detailed description, wherein only the preferred embodiments of the invention are shown and described, simply by way of illustration of the best mode contemplated of carrying out the invention. As will be realized, the invention is capable of other and different embodiments and its several details are capable of modifications in various obvious respects, all without departing from the invention. Accordingly, the drawings and description are to be regarded as illustrative in nature and not as restrictive.

BRIEF DESCRIPTION OF DRAWINGS

FIG. 1 is a depiction of a currently used coin telephone information card;

BEST MODE FOR CARRYING OUT THE INVENTION

Figure 3:
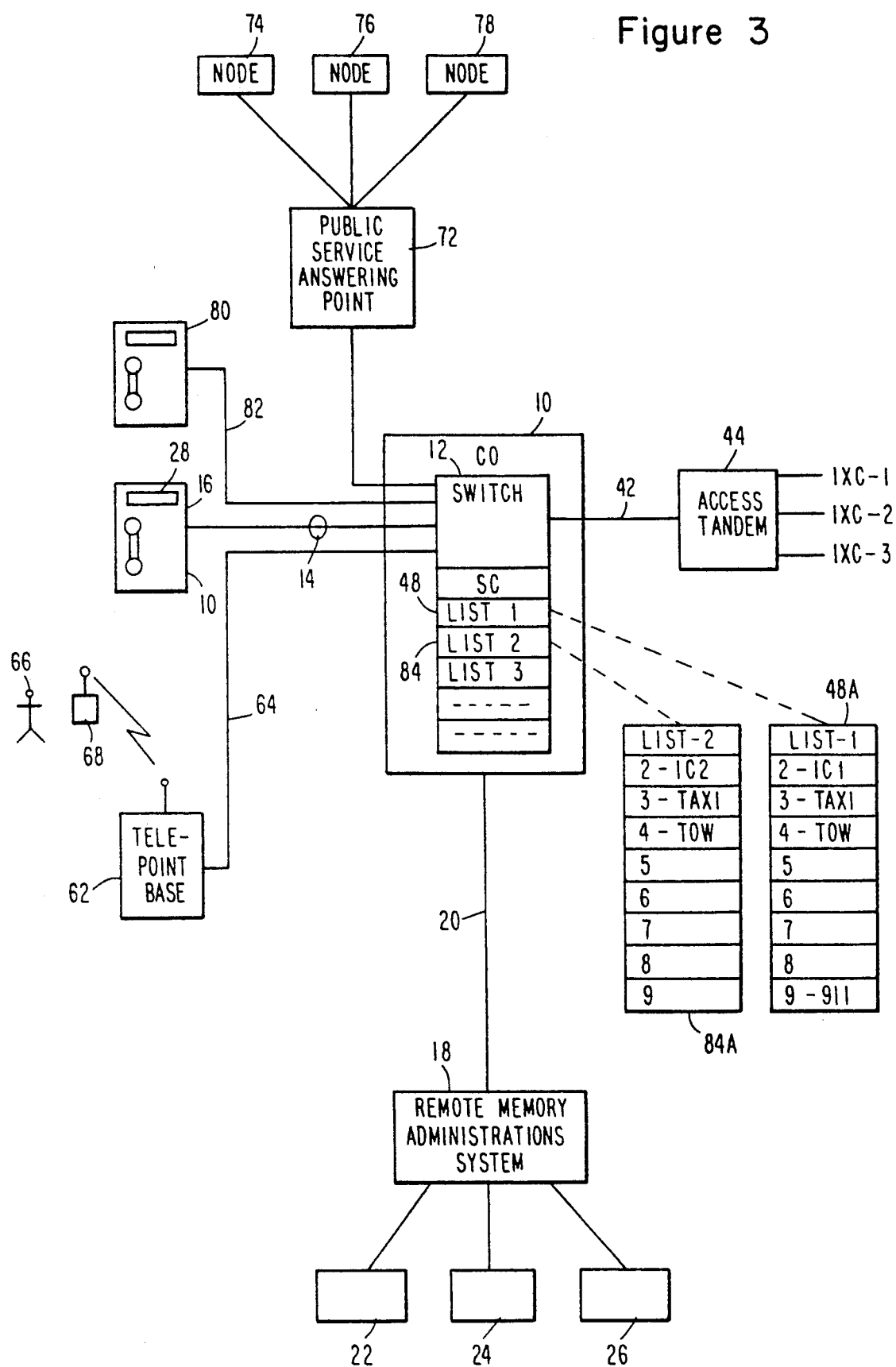
FIG. 3 is a diagrammatic block diagram illustration of the preferred embodiment of the invention.

Referring to FIG. 3 there is shown a conventional local telephone network which includes a Central Office 10 housing a switch 12 of the Stored Program Control (SPC) type. The switch 12 is connected via link 14 to a public coin telephone station 16. It will be appreciated that the link 14 may be a local loop or may include intermediate switches and trunks. However for purposes of explanation the link 14 may be considered to constitute a local loop with the CO 10 serving as the end office (EO).

A remote memory administration system (RMAS) or a MIZAR computer 18 is connected to the switch 12 by a recent change channel 20. RMAS and MIZAR are commercial designations used to refer to computers which are adapted to respond to input signals to Stored Program Control (SPC) switching systems to effect changes to line and trunk translations that have not been merged with the data base. As will be understood, such switches are controlled by a switch computer whereby the specific switching functions are implemented in a series of software routines which are commonly referred to as generic programs. The switch computers are distinct from the RMAS or MIZAR computer. The generics are developed by the switch manufacturer and loaded into the switch for subsequent use at the local switching office. Through the generics the switch is able to provide a predetermined selection of enhanced services to any local customer that is connected to the switch and who subscribes to such programs.

According to the invention the switch 12 is provided with generics which include routines to be described.

The recent change channel is a general purpose IO port used for programming switch translation variables. A series of technician or Recent Change Memory Administration Center (RCMAC) terminals 22, 24, 26 are connected to access the RMAS which is frequently referred to as the RCMAC. As will be understood, the RMAS runs on a separate mini-computer and provides service technicians or operators with formatted CRT screens at terminals 22, 24 and 26 to enter service orders. The computer reformats the service order entries from the technicians into the recent change format appropriate to the central office type switch being accessed (1ESS, 1AESS, 5ESS, etc.). The RMAS thus translates the screen inputs into proper recent change requests and submits them to the appropriate CO switch in an orderly fashion.

The coin telephone station 16 is provided with an information card 28 which provides directions for use of the telephone as well as local Service Provider and Long Distance Provider data. A typical such card is illustrated in FIG. 1. Referring to that figure it will be seen that the Service Provider information is provided at 30 and 32 and the Long Distance Provider or interexchange carrier information is provided at 34. Instructions for use of the telephone are provided in conventional fashion at 36, and information regarding the option for the user to use their own preferred carrier is provided at 38. The emergency 911 number is prominently displayed at 40. It will be apparent that if the identity of the interexchange carrier is changed, each card bearing the outdated designation will have to be changed by manually visiting each telephone station and making the exchange.

Referring to FIG. 3, the switch 12 in central office 10 is connected via trunk 42 to an access tandem 44 as a point of termination for interexchange carriers (IXC) IXC-1, IXC-2, IXC-3, etc.

According to the invention the switch 12 has established in its generics a speed calling feature 46 which includes a list 48 shown in expanded form at 48A. This speed calling feature which is utilized according to the invention differs in one respect from the currently available Enhanced Service speed calling which is currently available in that the existing feature which may permit a user or caller to change numbers in the speed calling (SC) list is blocked. At the same time the conventional SPC switch program which normally blocks the establishment of an SC list for a coin telephone is disabled to permit the assignment of coin telephone station 16 to the speed calling list 48 in switch 12 in central office 10. The list 48 thus resides in the end office 10 to which the coin telephone station 16 is connected by local loop 14.

The list 48A illustrated in FIG. 3 in an exemplary fashion comprises an 8 word speed calling list. However it will be understood that the number of words in the list is expandable at this time, up to 30 numbers.

The list 48A is established or created through the RCMAC 18 by administrators operating terminals 22, 24 and 26. The list may be subsequently changed only through the RCMAC and not by the stations assigned to the list, which may constitute all coin telephone stations served by switch 12. The code word "2#" is universally assigned to route a call to the Interexchange Carrier which is assigned to the coin telephone station 16. Thus a user of coin telephone station 16, upon receiving a dial tone, may dial "2#" whereupon the speed calling feature 46 in switch 12 will automatically route the call to the assigned Interexchange Carrier via trunk 42 and access tandem 44. It will be understood that the "#" symbol entry is not necessarily required. Upon the switch receiving a "2" which is not followed by further digits the switch will time out and initiate the dialing corresponding to the "2" in the list 48A.

Under existing switch programming the dialing of 700-555-1212 results in connection to the presubscribed Interexchange Carrier.

When the user dials "2#" this results in SC dialing of 700-555-1212 for connected or subscribing coin telephone stations. The switch reads this as a Special Access Code (SAC) call and goes into the translations for the calling line or station to identify the presubscribed Interexchange Carrier. Having identified that the program proceeds to a further translation in the carrier information table which designates the trunk and carrier to whom the call is to be forwarded. The presubscribed carrier can be changed via the RCMAC so that the correct carrier is reliably accessed. This eliminates the confusion and billing problems which result from the unavoidable delay between a change in presubscribed carrier and the physical change of the conventional information card on the telephone station.

Upon connection the user hears the recording used by that carrier such as, "Thank you for using AT&T or MCI or Sprint etc.", followed by directions for making the desired call. This places the responsibility and obligation of providing such a recording on the IC and eliminates the need to include such a feature and equipment in the central office. The present dial instruction card illustrated in FIG. 1 is changed to a generic card which may be of the form shown in FIG. 2.

Figure 2:
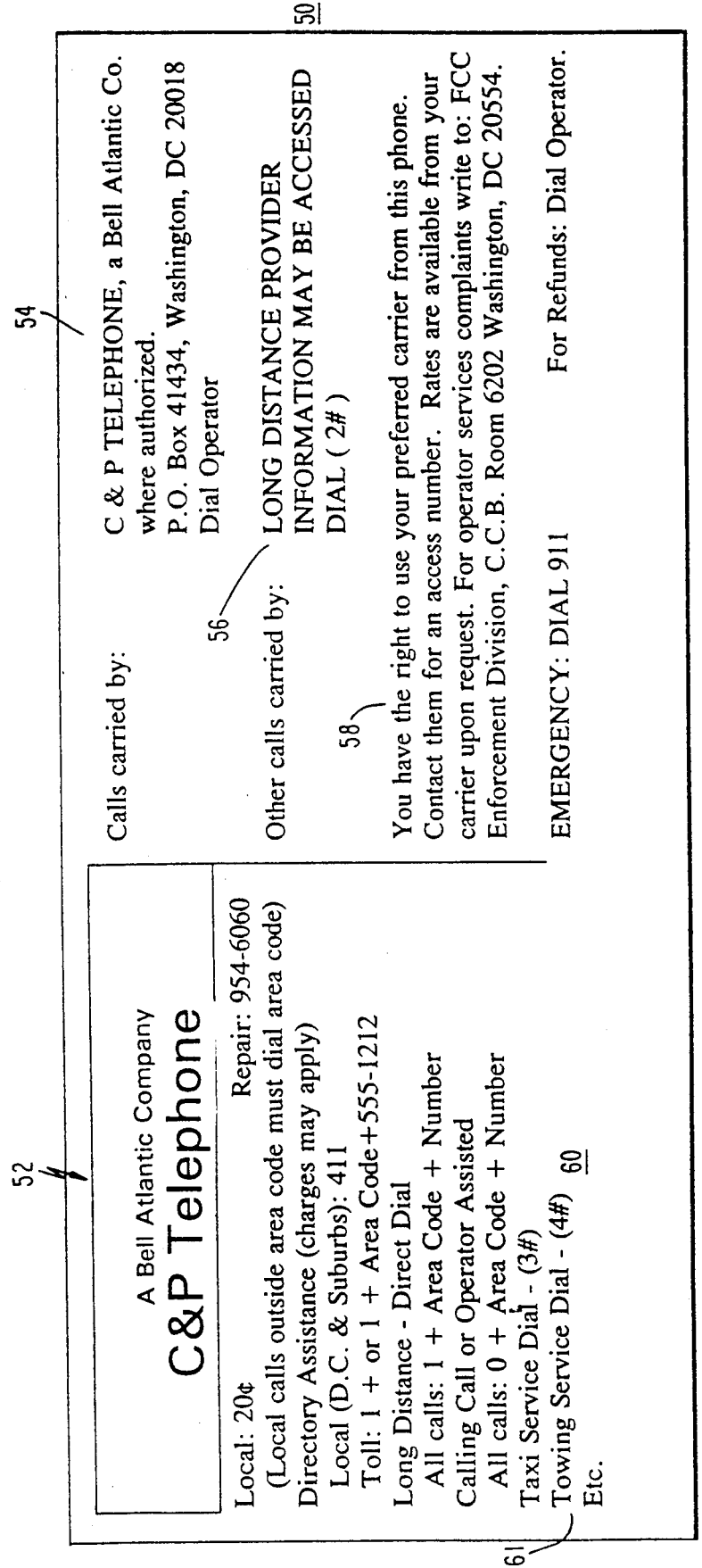
FIG. 2 is a depiction of a generic card for use according to the invention.

Referring to FIG. 2 there is seen a generic card 50 carrying the Local Provider information at 52 and 54 and carrying the generic Interexchange Carrier identification in the form of the notification appearing at 56. As illustrated this may comprise: "Long Distance Provider information may be accessed. Dial (2#)." Dialing of the code word "2#" results in connection to the presubscribed Interexchange Carrier as explained in connection with FIG. 1. Upon reaching that carrier the user receives the recording provided by such carrier. At the same time the user retains the ability to instead dial the access number provided by their own chosen carrier. This is indicated on the generic card 50 at 58. Thus this notification may state: "You have the right to use your preferred carrier from this telephone. Contact them for an access number. Rates are available from your carrier upon request."

As an alternative to initially dialing this alternate carrier number, a user may initiate the "2#" call and, upon learning the identity of the presubscribed carrier, hang up and enter the assigned number of their own chosen carrier. As seen in FIG. 2 the generic card 50 also carries at 60 the identification of the Emergency 911 directory number.

The use of a generic card according to the invention eliminates the necessity for changing individual cards monthly or every time a change is made. Inevitable changes in interexchange carrier assignments or subscriptions are effected centrally and remotely via the RMAS/RCMAC. A Recent Change Memory Administration Center may typically handle approximately 80 central offices dependent on computer size and transaction processing capability. Accordingly this method of interexchange carrier change represents an enormous improvement in the current necessity to effect such a change by manual exchange of cards at each involved coin telephone site.

While the invention has been described in conjunction with a coin telephone station it is another feature of the invention that the new service may also be provided to other public access telephones. Thus referring to FIG. 3 there is shown a Telepoint base station 62 connected to the switch 12 via a link 64 which may be a local loop or trunk connection. A Telepoint user illustrated at 66 carrying a transceiver 68 may communicate with the Telepoint base station 62 and switch 12 and thus access the same improved service of the invention described in conjunction with the coin telephone station 16.

In the case of wireless subscribers it is not possible to make card changes and the desired information is normally presented at least initially in the instruction manual or on an information card on the portable equipment. However since the equipment is portable its nature proscribes effective use of an information card attached to the equipment as a means of identifying the assigned Interexchange Carrier for the particular locale at which the user contacts a base station. The system of the invention is particularly efficacious under these circumstances in that it offers a convenient access to an audible presentation of the desired Interexchange Carrier information by the user simply dialing the code word "2#", which information may be reliably included in the instructions for the equipment or on a card attached to the equipment.

A still further important feature of the invention is the inclusion in the speed calling list 48A of additional code words, i.e., 3#, 4#, 5#, etc. to 9# for the Emergency Number 911 in the illustrated example. To this end the switch 12 is connected via link 70 to a Public Service Answering Point (PSAP) 72 which in turn is connected to nodes 74, 76 and 78 for police, fire and ambulance services and the like. Upon dialing 9# a user of the coin telephone station 16 is thus automatically connected to the Emergency service.

Similarly a wireless telephone station user 66 within range of the base station 62 may also access the Emergency service. When this is done by a wireless caller, who may be located anywhere in the country, the caller is connected to the Emergency Service that is associated with the base station which was accessed, which would represent the nearest such station and most rapid availability of such service. Even in the event where the wireless caller is unable to identify their location, the equipment knows that the call was made from within, for example, a 200 foot radius of the base station. This is accomplished via the Caller ID feature or the ANI currently used for E911.

While the invention has been discussed thus far in connection with a single list 48A it is to be understood that this has been for purposes of illustration only. In use each central office switch programmed to provide the service will contain multiple lists to permit proper assignment of Interexchange Carriers to the involved coin telephone stations. Thus there is also shown in FIG. 3 by way of illustration a coin telephone station 80 connected to the switch 12 via link 82. The coin station 80 is also a subscriber to the speed calling service but subscribes to a different Interexchange Carrier than coin telephone station 16. In addition the coin station 80 may be located in a different section of the city and may be assigned to a second list indicated at 84 in switch 12. That list is illustrated in expanded form at 84A. In this list the dialing of "2#" results in connection to the IC number 700-555-1212 which here designates a different Interexchange Carrier and reception of the different recording utilized by that carrier. The second list 84 may also designate different taxi, towing and the like services utilized in the different city section as presently described.

In operation, the switch 12 first interprets the line identification by ANI or Caller ID and looks at the translations for that line. Upon establishing that the line is entitled to speed calling the program next determines the list to which that line is assigned and refers to that list. The program then identifies the list code word which was dialed by the station and references the significance of that word on the list to which that station is assigned. Thus while there is a commonality and universality of the code words which permit the use of a generic card, the use of the universal number results in action particularized to the individual calling line whether it be a coin telephone station or a wireless telephone base station.

In addition to a long distance and emergency connection by single digit dialing the invention also provides for similar accessing of those services which the public utilizes most often. Examples are taxi services, tow services and the like. Thus the user dialing of the code word "3#" may result in connection to a taxi service, "4#" may result in connection to a tow truck service, etc. The invention is particularly adapted to establishing connection with the most proximate and convenient service in the area involved.

In situations where competing taxi companies seek designation for the same area two solutions are readily available. For example, the universal taxi number may result in connection to an intermediate message that states, for example, "You have reached Taxi Service. Dial '1' for a Red Cab or dial '2' for a Green Cab, etc." Alternatively, Universal Call Distribution (UCD) may be used wherein calls are automatically rotated between subscribing taxi companies to provide equalization. The identifying code words or numbers are the same in all cases and may be advertised either within a region or nationally as through the yellow pages as well as on the generic cards attached to public telephone stations as shown at 16 in FIG. 2. With respect to services such as taxi services the code information also may be carried on the sides of the taxis.

A further advantage of the service is its applicability to any type of telephone station, DTMF, dial, and wireless. The involved switch may be analog or digital so long as it is programmed. The switch generic overwrites may ultimately be incorporated into the original switches as provided by the switch vendors thereby eliminating any need for change in the switch generics on the site and resulting also in a saving which may be passed on to the consumer.

The setup and operation of the system may be described as follows. Assuming a public switched telecommunications network which includes program controlled switches which are interconnected by trunks and which have local telephone stations connected by local loops to at least certain of such switches. The local stations include coin telephone stations and base stations for wireless telephone services. The network includes a recent change RMAS or MIZAR computer in a RCMAC for programming the switch translation variables of the switches. These generics include a speed calling feature.

Using the RCMAC there is established in at least certain end office switches a plurality of lists having common or universal code words which designate common or universal services, such as, for example, 2# - Long Distance Provider; 3# - Taxi Service; 4# - Tow Service . . . ; 9# - 911. For each such code word a directory number is established in each list. The directory number for the code word "2#" may be 700-555-1212. The directory number for the code word "3#" may be XXX-XXX-XXXX. The directory number for the code word "4#" may be YYY-YYY-YYYY.

The switch translations are established so that the speed dialing of 700-555-1212, accompanied by receipt of data identifying the calling line, accesses translation information which indicates the identity o the Interexchange Carrier presubscribed to that line. Upon establishing that information the switch program control effects speed dialing of that Interexchange Carrier. Upon the IC receiving the call it goes off hook and connects to the caller at the involved public access station a recording which identifies the Interexchange Carrier and supplies any information which that carrier desires to provide. The connected caller may then dial the desired long distance directory number. In the alternative the caller may hang up and then again go offhook and dial their own chosen IC.

In the case where the caller dials the code word "3#" the switch ascertains that the accessing line subscribes to the service and thereupon identifies the list to which that line is assigned. In the case where a single taxi company is assigned to the code word "3#" the switch dials that number to place the caller in communication with the taxi company. In the case where multiple taxi service providers are involved the switch program may trigger voice prompts to secure from the caller a DTMF selection of companies, or alternatively, may actuate the Universal Call Distribution (UDC) process to select a company and then establish connection between that company and the caller. The same procedure may be followed with respect to the remaining listed service providers. If the caller dials the word code "9# " they are connected to the PSAD which then determines the nature of the emergency and the particular emergency service to which it is to be directed.

While the abbreviated code words used in the lists are common or universal the directory numbers assigned to those lists are customized to the particular public access telephone station. Thus while the abbreviated code word "3#" may designate taxi company "A" or taxi companies "A" and "B" in one area of a community, the same common or universal code word may designate different taxi companies in different areas of the community where such taxi companies, such as companies "C" and "D" may be more convenient. The same is true with respect to the designation of other service providers who may serve different areas of the community.

It will be appreciated that with this system a common list is utilized for a large number of public access stations with the ability to make list changes centrally through the RCMAC. This permits use of a generic information card on public coin stations and eliminates the necessity for expensive changes in such cards to update the information which they carry.

The code words or numbers utilized in the centralized list may be universally used on a national basis and economically serve a significant public purpose. Existing switches may be programmed to effectuate the service and the new programming can ultimately be incorporated in new switches supplied by the manufacturers. The information conveyed to the public through the use of the generic card is instantaneously accurate, an advantage that cannot be obtained with even the most expeditious substitution of present day cards to reflect accurate information. The system is particularly helpful to the disabled such as the blind. The system also permits accurate presentation of necessary information to users of wireless telephones.

While the use of a centralized provider and service list represents the preferred embodiment of the invention it is also a feature of the invention to provide enhanced speed calling on an improved but less universal basis which may require modification or replacement of some existing equipment.

Figure 4:
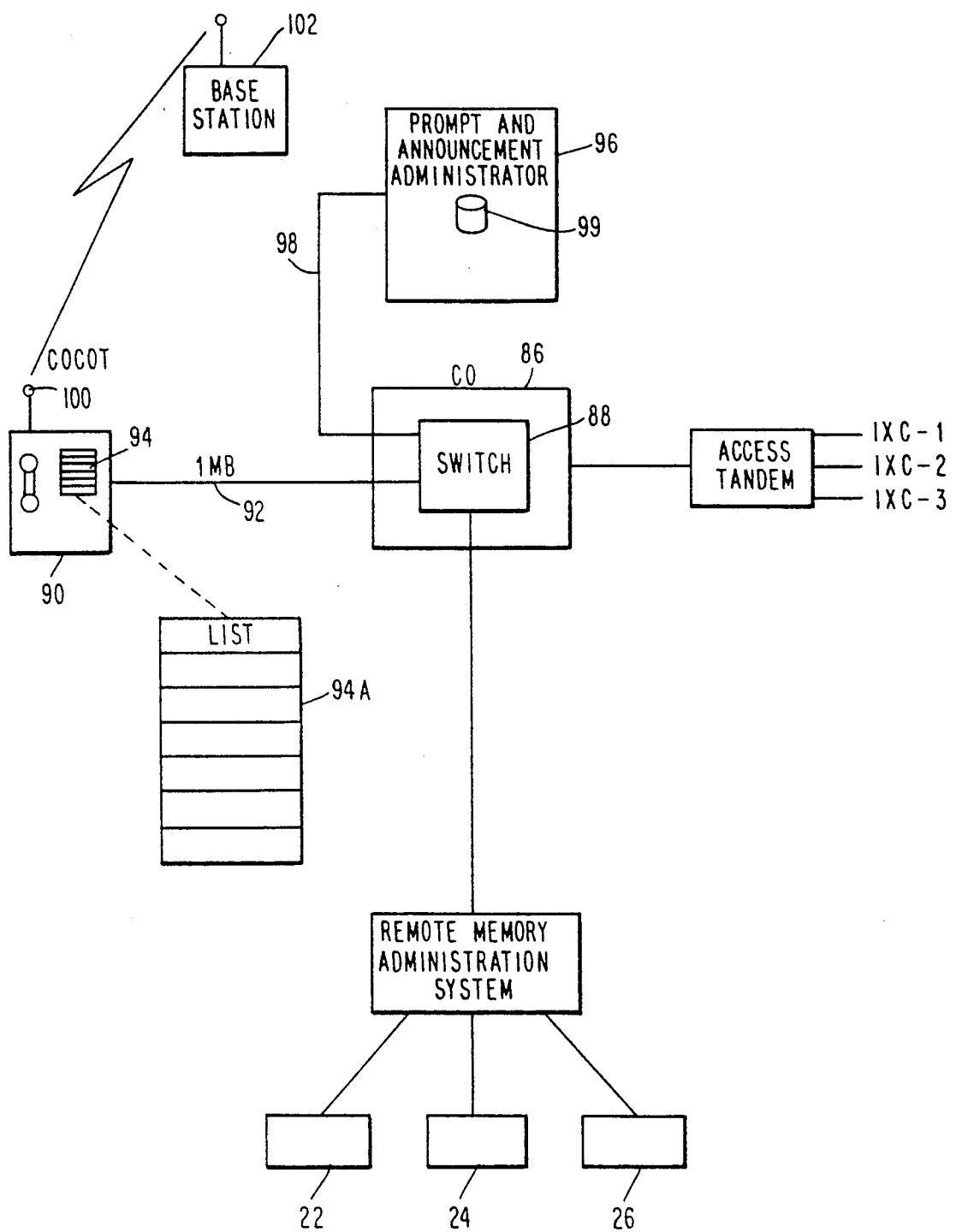
FIG. 4 is a diagrammatic block diagram illustration of a second embodiment of the invention.

Referring to FIG. 4 there is shown an illustration of one such system. Referring to that figure there is shown a central office 86 containing an SPC switch 88. Connected to the switch 88 is a Customer Owned Coin Telephone (COCOT) station 90. The station 90 may be connected to the switch 88 by means of a 1 MB line 92. The COCOT 90 is constructed to contain a Random Access Memory (RAM) in which a list 94 is stored. The list 94 is shown in enlarged view at 94A and is similar to the list described in connection with the description of FIG. 3.

With this arrangement a generic card may be used and the operation from the standpoint of the COCOT user would be similar to that described in conjunction with the embodiment of the invention illustrated in FIG. 3.

With this type of non-Telco system an administrator CTP 96 is required and may be connected to the switch 88 via a line 98. The administrator CTP contains a recording or storage capacity and facility 99 to handle the necessary announcements and prompts such as in coping with situations of the multi-taxi company type. Alternatively the private owner may contract with the Telco for handling of such storage and functions via Telco voice mail equipment or the like. Changes in the list 94 must be effected on a COCOT-by-COCOT basis by the administrator.

As an alternative to permit simultaneous updating of multiple COCOTs the COCOT stations may be provided with radio links 100 which are subject to access from a base station 102. As will be apparent this embodiment involves the use of additional equipment which would require either the modification of existing equipment or its replacement.

Figure 5:
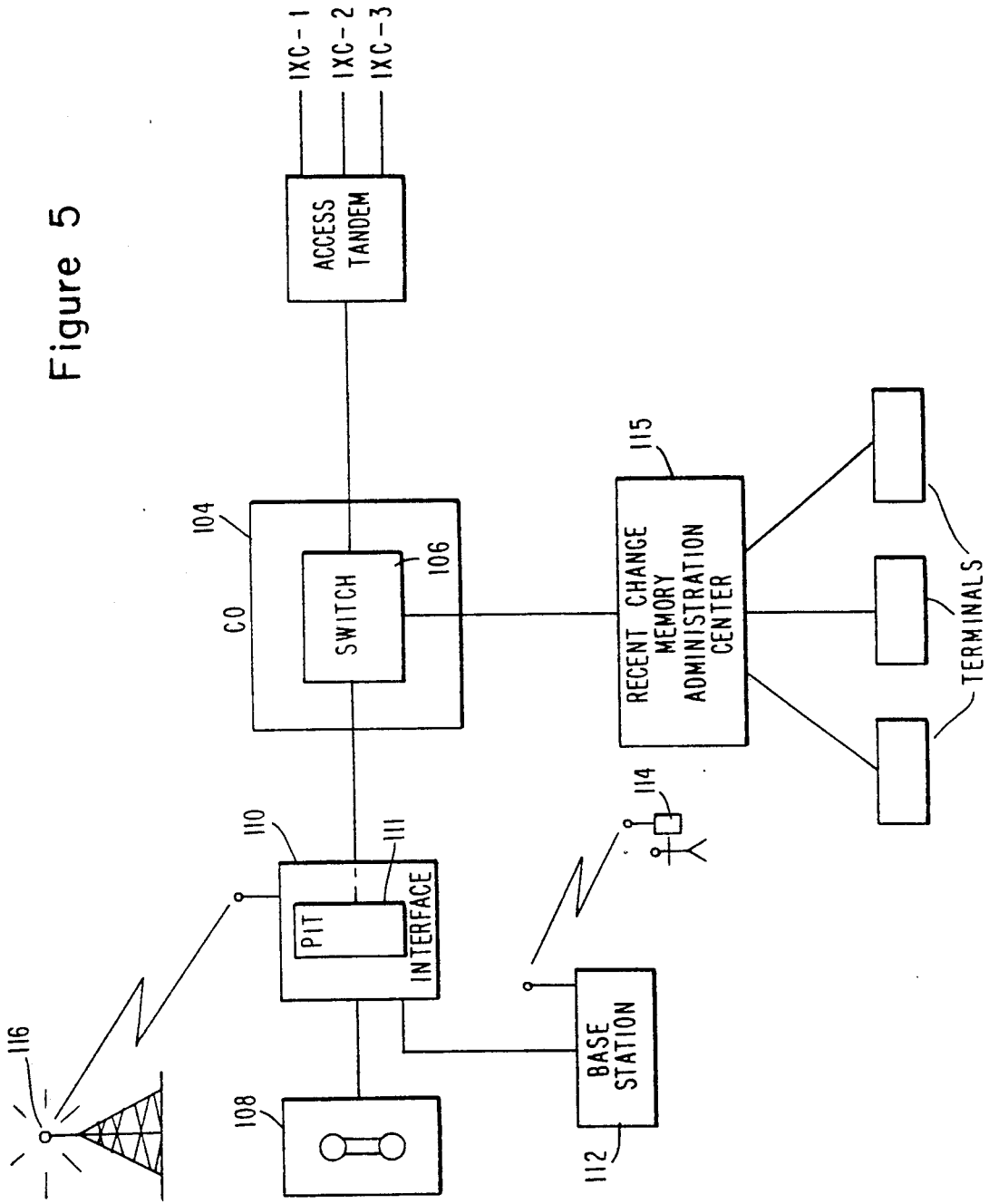
FIG. 5 is a diagrammatic block diagram illustration of another embodiment of the invention.

Referring to FIG. 5 there is shown still another embodiment of the invention wherein a central office 104 having an SPC switch 106 is connected to a coin telephone station 108 through an interface 110 containing a Digital Interpreter Table (DIT) 111. In this embodiment the interface monitors the calls originating at the coin telephone station 108 and makes the necessary translations to dial the 700-555-1212 number in the case of a long distance call or the 911 number in the case of an emergency call. This permits use of a generic card on the coin telephone stations. In addition the DIT may be utilized to translate the previously discussed service code words to obtain taxi or tow or the like service. The interface monitor 110 may also be connected to a wireless telephone base station 112 for providing service to wireless telephones such as illustrated at 114. The mode of operation is similar to that described with respect to the coin telephone station 108.

The interface monitor embodiment permits the use of generic cards but requires additional equipment containing multiple translation tables as opposed to the common list arrangement described in connection with the preferred embodiment illustrated in FIG. 3. Interface DIT translations may be changed by individually accessing each DIT by means of an RCMAC 115.

As an alternative means of effecting change in the interface units, they may be provided with a paging link to a suitable radio transmitter such as illustrated diagrammatically at 116. This technique permits simultaneous updating of all interface units. However additional equipment is again required.

Figure 6:
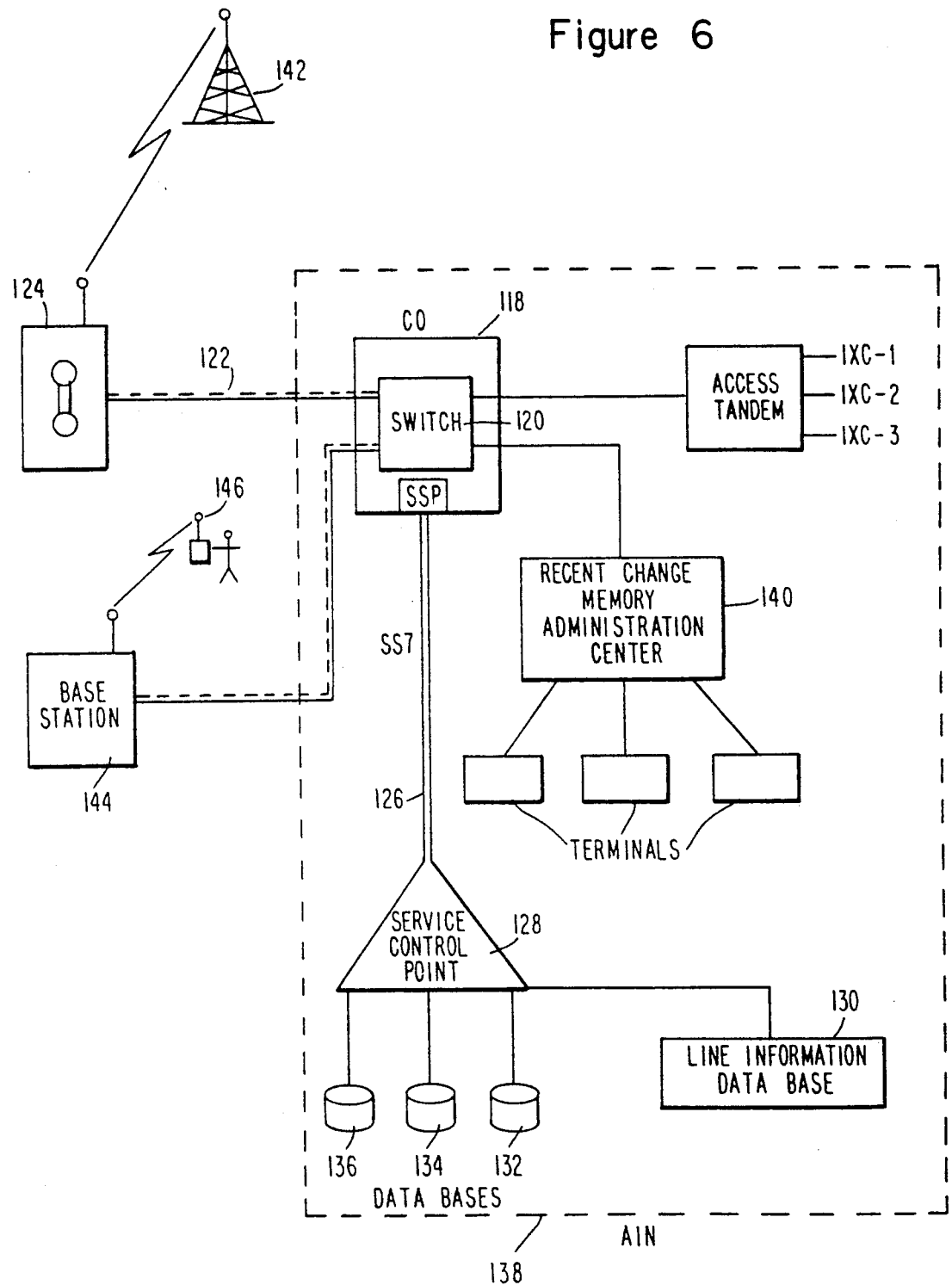
FIG. 6 is a diagrammatic block diagram illustration of still another embodiment of the invention.

Referring to FIG. 6 there is shown a still further embodiment of the invention adapted to ISDN and the Advanced Intelligent Network (AIN). According to this embodiment a central office 118 containing a digital ISDN switch 120 is connected by an ISDN link 122 to a coin telephone station 124. As will be understood this entails common channel signaling links between central offices which permits out of band signaling. With such a system the information that presently goes from the telephone station to the central office does not require signaling information traveling over the same path as the voice channel. The signaling information is sent in advance to ascertain whether the desired line is available at the other end. In the event that it is not the calling equipment simply drops off without tying up intermediate equipment. Otherwise the signaling information proceeds over an SS7 link 126 through a Service Control Point or platform (SCP) 128 to a Line Information Data Base (LIDB) 130. The Service Control Point 128 is provided with a variety of data bases indicated diagrammatically at 132, 134, and 136, for providing the features of the Advanced Intelligent Network represented by the broken line 138.

The Line Information Data Base 130 ascertains the features possessed by the calling coin telephone station 124. On establishing that the station is entitled to enhanced speed calling access is then had to the appropriate data base 132-136 for a translation of the particular code word received, such as "2#". Once this is established the call to the Long Distance Provider is made in the manner previously described. The SCP and its associated equipment thus emulates what the central office does in-band in current equipment. As will be understood the Service Control Point 128 may serve multiple central offices and switches. With this embodiment desired changes in the lists or translations may be made through an RCMAC 140 accessing the SCP 128 and its associated data bases.

If the coin telephone stations are provided with built in speed call lists, changes may be made over a broadcast link indicated at 142. In addition to the coin telephone station 124 the central office 118 and its switch 120 may also serve a wireless base 144 communicating with wireless telephone stations 146 as described with respect to the previous embodiments.

In this disclosure there is shown and described not only the preferred embodiment of the invention but also examples of its versatility. It is to be understood that the invention is capable of use in various other combinations and environments and is capable of modifications within the scope of the inventive concept as expressed herein.

Still other objects and advantages of the present invention will become apparent to those skilled in this art from the foregoing detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

I claim:

1. In a public switched telecommunications network including stored program control (SPC) switch means interconnected by trunks and having plural public access telephone stations (PATS) means connected to at least certain of said SPC switch means, recent changes computer means connected to said switch means for effecting changes in SPC translations therein, at least certain of said SPC switch means including means for providing speed calling (SC) services to non-coin telephone station means connected thereto to permit carriers of said non-coin telephone stations means to establish and change at least one corresponding SC list and provide SC services, terminal node means for interexchange carriers (IC) to which multiple ICs are connected, at least certain of said PATS means having a corresponding presubscribed IC to which each of said certain PATS means is automatically connected upon the dialing of a corresponding pre-established multi-digit IC number, the method of comprising the steps of:
  (a) establishing in at least certain of said SPC switch means multiple SC list means, assigned to and accessible by at least certain of said PATS means;
  (b) establishing in each of said multiple SC list means a first common abbreviated code word for effecting speed dialing of a single multi-digit, IC number from a group of multi-digit IC numbers, each being accessible by said first common abbreviated code word;
  (c) identifying a single predetermined SC list means assigned to a calling one of said certain PATS means which dialed said first common abbreviated code word and identifying an IC presubscribed to said calling PATS means by inclusion of said single predetermined SC list means;
  (d) effecting the generation of a corresponding pre-established multi-digit IC number responsive to the dialing of said first common abbreviated code word at said calling PATS means connected to one of said certain SPC switch means containing multiple SC list means to establish connection between said calling PATS means and said presubscribed IC;
  (e) transmitting from said presubscribed IC to said calling PATS means a prestored message identifying said presubscribed IC and identifying specific steps to be taken by a caller using said calling PATS means to cause establishment of a long distance connection through said presubscribed IC; and
  (f) responsive to said specific steps being taken by a caller at said calling PATS means, establishing said long distance connection.

2. A method according to claim 1 including the step of transmitting signals from recent change computer means to said certain SPC switch means for which said SC list means for certain of said PATS means has been established to change the identity of the presubscribed ICs.

3. A method according to claim 1 including the steps of:

establishing in selected SC list means of said multiple SC list means a second common abbreviated code word corresponding to a directory number of a public service provider;

identifying said single predetermined SC list means assigned to said calling PATS means which dialed said first common abbreviated code word and identifying from said single predetermined SC list means said directory number of said public service provider; and establishing connection between said calling PATS means and said public service provider.

4. A method according to claim 1 wherein a different SC list means is provided for each prescribed IC.

5. A method according to claim 4 including the step of transmitting signals from said recent change computer means to said certain SPC switch means for which said single predetermined SC list means for said calling PATS means has been established to change said single predetermined SC list means assigned to said calling PATS means.

6. A method according to claim 1 wherein said multiple SC list means are accessible by coin telephone station means.

7. A method according to claim 1 wherein said multiple SC list means are accessible by wireless telephone base station means.

8. In a public switched telecommunications network including stored program control (SPC) switch means interconnected by trunks and having plural public access telephone stations (PATS) means connected to at least certain of said SPC switch means, recent change computer means connected to said switch means for effecting changes in SPC translations therein, at least certain of said SPC switch means including means for providing speed calling (SC) services to non-coin telephone station means connected thereto to permit carriers of said non-coin telephone station means to establish and change at least one corresponding SC list and provide SC services, terminal node means for interexchange carriers (IC) to which multiple ICs are connected, at least certain of said PATS means each having a corresponding presubscribed IC to which each of said certain PATS means is automatically connected upon the dialing of a corresponding pre-established multi-digit IC number, the method comprising the steps of:
  (a) establishing in at least certain of said SPC switch means multiple SC list means assigned to and accessible by at least certain of said PATS means including coin telephone station (CTS) means;
  (b) establishing in each of said multiple SC list means a first common abbreviated code word for effecting speed dialing of a single multi-digit IC number from a class of multi-digit IC numbers, each being accessible by said first common abbreviated code word;
  (c) identifying a single predetermined SC list means assigned to a calling one of said certain PATS means which dialed said first common abbreviated code word and identifying an IC presubscribed to said calling PATS means by inclusion of said single predetermined SC list means;
  (d) effecting the generation of a corresponding pre-established multi-digit IC number responsive to the dialing of said first common abbreviated code word at said calling PATS means connected to one of said certain SPC switch means containing multiple SC list means to establish connection between said calling PATS means and said presubscribed IC;

(e) transmitting from said presubscribed IC to said calling PATS means a prestored message identifying said presubscribed IC and identifying specific steps to be taken by a caller using said calling PATS means to cause establishment of a long distance connection through said presubscribed IC; and (f) responsive to said specific steps being taken by a caller at said calling PATS means, establishing said long distance connection.

9. A method according to claim 8 including the step of transmitting signals from said recent change computer means to said certain SPC switch means for which said SC list means for said PATS means has been established to change the identity of the presubscribed IC.

10. A method according to claim 8 including the steps of:

establishing in selected SC list means of said multiple SC list means a second common abbreviated code word corresponding to a directory number of a public service provider;

identifying said single predetermined SC list means assigned to said calling PATS means which dialed said first common abbreviated code word and identifying from said single predetermined SC list means said directory number of said public service provider; and establishing connection between said calling PATS means and said public service provider.

11. A method according to claim 10 wherein different SC list means are provided in certain of said SPC switch means according to the public service providers assigned to said certain ones of said PATS means.

12. A method according to claim 11 including the step of transmitting signals from said recent change computer means to said certain SPC switch means for which said single predetermined SC list means for said calling PATS means has been established to change said single predetermined SC list means assigned to said calling PATS means.

13. In a public switched telecommunications network including stored program control (SPC) switch means interconnected by trunks and having plural coin telephone station (CTS) means connected to at least certain of said switch means, recent change computer means connected to said SPC switch means for effecting changes in SPC translations therein, at least certain of said SPC switch means including means for providing speed calling (SC) services to non-coin telephone station means connected thereto to permit interchange carriers of said coin and non-coin telephone station means to establish and change their SC list means and provide SC services, terminal node means for interexchange carriers (IC) to which multiple ICs are connected, at least certain of said CTS means each having a presubscribed IC to which they are automatically connected upon the dialing of a pre-established multi-digit IC number, the method comprising the steps of:

(a) establishing in at least certain of said SPC switch means multiple SC list means assigned to and accessible by at least certain of said CTS means;

(b) establishing in each of said multiple SC list means a first common abbreviated code word for effecting speed dialing of a single multi-digit IC number from a group of multi-digit IC numbers, each being accessible by said first common abbreviated code word;

(c) identifying a single predetermined SC list means assigned to a calling CTS means which dialed said first common abbreviated code word and identifying an IC presubscribed to said calling CTS means;

(d) effecting the generation of a corresponding pre-established multi-digit IC number responsive to the dialing of said first common abbreviated code word at said calling CTS means connected to a SPC switch means containing an SC list means for said CTS means to establish connection between said calling CTS means and said presubscribed IC;

(e) transmitting from said presubscribed IC to said calling CTS means a prestored message identifying said presubscribed IC and identifying specific steps to be taken by a caller at said CTS means to cause establishment of a long distance connection through said presubscribed IC;

(f) responsive to said specific steps being taken by a caller at said calling CTS means, establishing said long distance connection; and (g) transmitting signals from said recent change computer means to said SPC switch means for which said SC list means for certain of said CTS means has been established to change the identity of the presubscribed IC.

14. A method according to claim 13 including the step of providing at certain of said CTS means generic visible data means for providing to users identification of the presubscribed IC for each said CTS means.

15. A method according to claim 14 including the step of transmitting signals from said recent change computer means to said certain SPC switch means for which said single predetermined SC list means for said calling CTS means has been established to change said single predetermined list means assigned to said calling CTS means.

16. A method according to claim 13 wherein said multiple SC list means are accessible by wireless telephone base station means.

17. A method according to claim 13 including the steps of:

establishing in selected SC list means of said multiple SC list means a second common abbreviated code word corresponding to a directory number of a public service provider;

identifying said single predetermined SC list means assigned to said calling CTS means which dialed said first common abbreviated code word and identifying from said single predetermined SC list means said directory number of said public service provider; and establishing connection between said calling CTS means and said public service provider.

18. A method according to claim 13 including the step of providing at certain of said CTS means generic visible data means for providing to users identification of a second common abbreviated code word for a public service provider and the type of public service provider accessed by said second common abbreviated code word.

19. In a telecommunication system having a plurality of stored program control (SPC) switching means interconnected by trunks, a plurality of subscriber stations arranged in groups with each group being served by one of said switching means, a switching network in each switching means for establishing communication paths between calling subscriber stations and called subscriber stations addressed by the calling stations, at least one of said switching means including means for providing speed calling (SC) services to subscriber stations served thereby, the group of subscriber stations served by at least one of said switching means including coin telephone station (CTS) means, computer means associated with said switching means and adapted to respond to input signals to generate recent change signals to program switch translation variables in said switching means, terminal node means for interexchange carriers (IC) to which multiple ICs are connected, at least certain of said CTS means, each having a presubscribed IC to which they are automatically connected upon the dialing of a pre-established multi-digit IC number, the improvement comprising:

means for providing SC services to said certain CTS means, said means for providing SC services including multiple SC list means having stored therein a common abbreviated code word for effecting speed dialing of a single multi-digit IC number from a group of IC numbers, each being accessible by said common abbreviated code word;

means responsive to the dialing of said common abbreviated code word for identifying a single SC list means corresponding to a calling one of said certain CTS means from which said common abbreviated code word is dialed;

means for connecting said calling CTS means to said presubscribed IC for said calling CTS means;

means for transmitting a stored message identifying said IC presubscribed to said calling CTS means; and visible data means, at said certain CTS means for displaying to a user a calling CTS means directions for dialing to obtain IC identification.

20. An apparatus according to claim 19 including means for blocking modification of said list means from said calling CTS means.

21. An apparatus according to claim 19 wherein said list means is included in said SPC switching means including means for providing SC services.

22. An apparatus according to claim 19 wherein at least a portion of said list means is included in said certain CTS means.

23. An apparatus according to claim 19 wherein at least a portion of said list means is located at an interface between said SPC switching means including means for providing SC services and said certain CTS means.

24. In a telecommunications system having a plurality of stored program control (SPC) switching means interconnected by trunks, a plurality of subscriber stations arranged in groups with each group being served by one of said switching mans, a switching network in each switching means for establishing communication paths between calling subscriber stations and called subscriber stations addressed by the calling stations, at least one of said switching means including means for providing speed calling (SC) services to subscriber stations served thereby, the group of subscriber stations served by at least one of said switching means including public access telephone station (PATS) means, computer means associated with said switching means and adapted to respond to input signals to generate recent change signals to program switch translation variables in said switching means, terminal node means for interexchange carriers (IC) to which multiple ICs are connected, at least certain of said PATS means each having a presubscribed IC to which they are automatically connected upon the dialing of a pre-established multi-digit IC number, the improvement comprising:

means for providing SC services to said certain PATS means, said means including multiple SC list means having stored therein a common abbreviated code word for effecting speed dialing of a single multi-digit IC number from a group of IC numbers, each said IC number being accessible by said IC number;

means responsive to the dialing of said common abbreviated code word for identifying a single SC list means corresponding to a calling one of said certain PATS means from which said common abbreviated code word is dialed;

means for connecting said calling PATS means to a corresponding presubscribed IC for said calling PATS means; and means for transmitting a prestored message identifying said IC presubscribed to said calling PATS means.

* * * * *